US010967362B2

(12) United States Patent
Kuno et al.

(10) Patent No.: US 10,967,362 B2
(45) Date of Patent: Apr. 6, 2021

(54) CATALYST FOR PURIFICATION OF EXHAUST GAS FROM INTERNAL COMBUSTION ENGINE AND METHOD FOR PURIFICATION OF EXHAUST GAS USING THE CATALYST

(71) Applicant: UMICORE SHOKUBAI JAPAN CO., LTD., Tokoname (JP)

(72) Inventors: Hirotaka Kuno, Himeji (JP); Masashi Nakashima, Himeji (JP); Yuzo Hamada, Himeji (JP); Masanori Ikeda, Himeji (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 9 days.

(21) Appl. No.: 16/318,531

(22) PCT Filed: Jul. 20, 2017

(86) PCT No.: PCT/JP2017/026334
§ 371 (c)(1),
(2) Date: Jan. 17, 2019

(87) PCT Pub. No.: WO2018/016601
PCT Pub. Date: Jan. 25, 2018

(65) Prior Publication Data
US 2019/0232258 A1    Aug. 1, 2019

(30) Foreign Application Priority Data
Jul. 20, 2016    (JP) .............................. JP2016-142702

(51) Int. Cl.
*B01J 23/44* (2006.01)
*B01J 23/63* (2006.01)
(Continued)

(52) U.S. Cl.
CPC ............ *B01J 27/045* (2013.01); *B01D 53/94* (2013.01); *B01D 53/9468* (2013.01);
(Continued)

(58) Field of Classification Search
CPC . B01J 23/44; B01J 23/464; B01J 23/63; B01J 35/04; B01J 27/045; F01N 3/10; F01N 3/2828; B01D 53/94; B01D 53/9468
See application file for complete search history.

(56) References Cited

U.S. PATENT DOCUMENTS 5,232,357 A * 8/1993 Dalia Betta ............. F23C 6/045
431/328
5,281,128 A * 1/1994 Dalia Betta ............. F23C 6/045
431/7
(Continued)

FOREIGN PATENT DOCUMENTS

JP    05-154382 A    6/1993
JP    08-38898 A    2/1996
(Continued)

OTHER PUBLICATIONS

Notice of Allowance dated Feb. 24, 2020, by the U.S. Patent and Trademark Office in U.S. Appl. No. 16/318,424. (9 pages).
(Continued)

*Primary Examiner* — Cam N. Nguyen
(74) *Attorney, Agent, or Firm* — Buchanan Ingersoll & Rooney PC

(57) ABSTRACT

A catalyst for purification of exhaust gas containing a phosphorus compound includes: a lower catalyst layer containing at least one of noble metal provided on a refractory three-dimensional structure; and an upper catalyst layer at an inflow side of exhaust gas and an upper catalyst layer at an outflow side of exhaust gas provided on a surface of the lower catalyst layer. The upper catalyst layer at the inflow
(Continued)

side and the upper catalyst layer at the outflow side have different concentrations of noble metal. The catalyst has an intermediate zone with a length of 3 to 23% of the overall length of the refractory three-dimensional structure provided between the upper catalyst layer at the inflow side and the upper catalyst layer at the outflow side. The intermediate zone starts from a position 10 to 38% from an end face of the catalyst at the inflow side of exhaust gas.

17 Claims, 1 Drawing Sheet

(51) Int. Cl.
| | |
|---|---|
| *B01J 35/04* | (2006.01) |
| *B01J 27/045* | (2006.01) |
| *F01N 3/10* | (2006.01) |
| *F01N 3/28* | (2006.01) |
| *B01D 53/94* | (2006.01) |
| *B01J 33/00* | (2006.01) |
| *B01J 37/02* | (2006.01) |
| *B01J 27/053* | (2006.01) |
| *B01J 37/08* | (2006.01) |

(52) U.S. Cl.
CPC .............. *B01J 23/63* (2013.01); *B01J 27/053* (2013.01); *B01J 33/00* (2013.01); *B01J 35/04* (2013.01); *B01J 37/02* (2013.01); *B01J 37/0228* (2013.01); *B01J 37/0236* (2013.01); *B01J 37/08* (2013.01); *F01N 3/10* (2013.01); *F01N 3/2828* (2013.01); *B01D 2255/1023* (2013.01); *B01D 2255/1025* (2013.01); *B01D 2255/9022* (2013.01); *F01N 3/281* (2013.01); *F01N 2330/02* (2013.01); *F01N 2330/06* (2013.01); *F01N 2370/02* (2013.01); *F01N 2510/0682* (2013.01); *F01N 2510/0684* (2013.01); *F01N 2570/08* (2013.01)

(56) References Cited

U.S. PATENT DOCUMENTS

| | | | | |
|---|---|---|---|---|
| 6,087,298 A * | 7/2000 | Sung | ............... | B01D 53/9472 |
| | | | | 502/333 |
| 6,375,910 B1 * | 4/2002 | Deeba | ............... | F01N 3/0814 |
| | | | | 423/239.1 |
| 7,524,465 B2 * | 4/2009 | Kumar | ............... | B01J 35/04 |
| | | | | 422/180 |
| 8,323,599 B2 * | 12/2012 | Nunan | ............... | B01J 23/464 |
| | | | | 423/213.2 |
| 8,394,348 B1 * | 3/2013 | Nunan | ............... | B01J 23/42 |
| | | | | 423/213.2 |
| 8,557,204 B2 * | 10/2013 | Nunan | ............... | B01J 23/464 |
| | | | | 423/213.5 |
| 8,853,120 B2 * | 10/2014 | Aoki | ............... | B01J 37/0244 |
| | | | | 502/303 |
| 8,968,690 B2 * | 3/2015 | Nunan | ............... | B01D 53/945 |
| | | | | 423/213.5 |
| 9,352,279 B2 * | 5/2016 | Greenwell | ............... | B01J 35/10 |
| 9,597,660 B2 * | 3/2017 | Aoki | ............... | B01J 35/04 |
| 9,789,443 B2 * | 10/2017 | Greenwell | ............... | F02B 5/00 |
| 9,873,085 B2 * | 1/2018 | Yoshida | ............... | B01J 23/10 |
| 2004/0002621 A1 | 1/2004 | Barnes et al. | | |
| 2007/0014705 A1 | 1/2007 | Franklin | | |
| 2008/0038172 A1 | 2/2008 | Chen et al. | | |
| 2009/0203515 A1 | 8/2009 | Murabayashi | | |
| 2015/0238951 A1 | 8/2015 | Aoki et al. | | |
| 2015/0367328 A1 | 12/2015 | Ikeda et al. | | |
| 2016/0001228 A1 | 1/2016 | Chang et al. | | |
| 2017/0043322 A1 * | 2/2017 | Chandler | ............... | B01J 23/58 |
| 2017/0087541 A1 | 3/2017 | Andersen et al. | | |
| 2017/0197179 A1 | 7/2017 | Yoshikawa | | |

FOREIGN PATENT DOCUMENTS

| | | |
|---|---|---|
| JP | 2001-205051 A | 7/2001 |
| JP | 2005-530614 A | 10/2005 |
| JP | 4751917 B2 | 6/2008 |
| JP | 2009-501079 A | 1/2009 |
| JP | 2009-172527 A | 8/2009 |
| JP | 4350250 B2 | 10/2009 |
| JP | 2010-500922 A | 1/2010 |
| JP | 2010-75835 A | 4/2010 |
| JP | 2010-167381 A | 8/2010 |
| JP | 4751917 B2 | 8/2011 |
| JP | 2011-255270 A | 12/2011 |
| JP | 2014-100658 A | 6/2014 |
| WO | 2007/057981 A1 | 5/2007 |
| WO | 2011/081219 A2 | 7/2011 |
| WO | 2014/119749 A1 | 8/2014 |
| WO | 2015/182726 A9 | 12/2015 |
| WO | 2016/004151 A1 | 1/2016 |

OTHER PUBLICATIONS

Examination Report dated Dec. 18, 2019, by the Intellectual Property Office of India in corresponding Indian Patent Application No. 201947005651. (6 pages).
The extended European search report dated Mar. 21, 2019, by the European Patent Office in corresponding European Patent Application No. 17631117.1. (7 pages).
The extended European search report dated Mar. 21, 2019, by the European Patent Office in European Patent Application No. 17831122.1. (7 pages).
Notification of Reasons for Refusal dated Mar. 12, 2019, by the Japanese Patent Office in corresponding Japanese Patent Application No. 2018-528874 and an English translation of the notification. (7 pages).
International Search Report (PCT/ISA/210) dated Nov. 21, 2017, by the Japan Patent Office as the International Searching Authority for International Application No. PCT/JP2017/026334.
Written Opinion (PCT/ISA/237) dated Nov. 21, 2017, by the Japan Patent Office as the International Searching Authority for International Application No. PCT/JP2017/026334.
Culley, et al., "The Impact of Passenger Car Motor Oil Phosphorus Levels on Automotive Emissions Control Systems", SAE Technical Paper Series, 961898, 1996, pp. 13-21. (11 pages).
International Search Report and the Written Opinion of the International Searching Authority (Forms PCT/ISA/210 and PCT/ISA/237) dated Oct. 24, 2017, by the Japanese Patent Office in International Application No. PCT/JP2017/026354 and an English translation of the Report and Opinion. (20 pages).
International Preliminary Report on Patentability dated Jan. 22, 2019, by the International Bureau of WIPO in International Application No. PCT/JP2017/026354 and an English translation of the Report (17 pages).
International Preliminary Report on Patentability dated Jan. 22, 2019, by the International Bureau of WIPO in corresponding International Application No. PCT/JP2017/026334 and an English translation of the Report. (11 pages).
Office Action dated Oct. 23, 2019, by the U.S. Patent and Trademark Office in U.S. Appl. No. 16/318,424. (12 pages).
Notice of Reason for Refusal dated Jul. 30, 2019, by the Japanese Patent Office in Japanese Patent Application No. 2018-528878, and an English translation of the Notice. (6 pages).

* cited by examiner

CATALYST FOR PURIFICATION OF EXHAUST GAS FROM INTERNAL COMBUSTION ENGINE AND METHOD FOR PURIFICATION OF EXHAUST GAS USING THE CATALYST

TECHNICAL FIELD

The present invention relates to a catalyst for purification of exhaust gas from an internal combustion engine and a method for purification of exhaust gas using the catalyst. More specifically, the present invention relates to a catalyst that can be used despite being exposed to exhaust gas containing phosphorus compound from an internal combustion engine at high temperature for a long time, and a purifying method for exhaust gas containing phosphorus compound using the catalyst.

BACKGROUND ART

According to tightening regulations on automobile emissions, there has been a demand for maintaining exhaust gas purification performance over a long time. This means that a demand for long service life of a catalyst as an after treatment device for exhaust gas purification has increased and also means that there has been a demand for improving the long-term durability of a catalyst. In order to improve the long-term durability of a catalyst, suppression of sintering or suppression of sulfur poisoning of the noble metal particles supported on a catalyst has been studied. Meanwhile, it is known that poisoning due to phosphorus contained in exhaust gas (hereinafter, referred to as phosphorus poisoning) exerts a great influence on deterioration in catalytic performance (Non-Patent Literature 1). In order to meet regulations which will be tightened more and more from now, it is important to suppress the phosphorus poisoning or to maintain and improve the catalytic performance after phosphorus poisoning. In recent years, there has been a demand for not only suppressing phosphorus poisoning, but also suppressing deterioration in catalytic performance even in cases where a catalyst is exposed to exhaust gas having a high temperature of 950° C. or higher. The demand for long service life of catalysts is higher than in the prior art, for example, the suppression of deterioration in catalytic performance due to both sintering and phosphorus poisoning is demanded.

The phosphorus poisoning is known to be caused by depositing or penetrating, into a catalyst layer, a phosphorus compound derived from a lubricant additive, such as zinc dialkyl dithiophosphate, which is contained in exhaust gas. It is known that phosphorus poisoning leads to deterioration in catalytic performance (Non-Patent Literature 1).

The catalytic performance deterioration due to the phosphorus poisoning is known to be caused by occurrence of the phenomena described below. Diffusional inhibition of the exhaust gas in the catalyst layer is caused by the phosphorus compound being deposited or penetrated into the catalyst layer. In addition, cerium oxide of an oxygen-storage-release material (oxygen storage material) that is widely used in a three-way catalyst and a phosphorus compound react with each other to form cerium phosphate. The oxygen storage and release are hindered when cerium phosphate is formed, and thus the release when the exhaust gas atmosphere is changed to a lean or rich state is hindered. The purification efficiency of exhaust gas decreases as these phenomena occur.

It is disclosed that performance deterioration can be decreased by using a composite oxide of ceria with zirconia in a catalyst using palladium in order to suppress the phosphorus poisoning (Patent Literature 1).

Further, it is disclosed that performance deterioration due to phosphorus is suppressed by providing a region which is not coated with a catalyst layer as a phosphorus capture zone at a front end of a catalyst structure (Patent Literature 2).

A catalyst is disclosed in which an upper catalyst layer supports Rh, a lower catalyst layer supports Pd on an upstream end, and on an upstream portion including an upstream end of a base material, a single layer constituted only by a Pd support layer is provided (Patent Literature 3).

CITATION LIST

Patent Literatures

Patent Literature 1: JP H8-38898 A
Patent Literature 2: JP 2009-501079 A (US 2007/014705 A1)
Patent Literature 3: JP 4751917 B (WO 2010/001226 A1)

Non-Patent Literature

Non-Patent Literature 1: A. Scott et. al., SAE Paper, 961898, (1996)

SUMMARY OF INVENTION

Technical Problem

However, the method of Patent Literature 1 is the result of ceria which is likely to form cerium phosphate in a catalyst using, as a catalyst component, palladium which has a low resistance to phosphorus poisoning, and differs from the present invention which focuses on the deterioration in catalytic performance due to phosphorus poisoning of the most highly active rhodium as a three-way catalyst. In addition, the method of Patent Literature 1 discloses that the phosphorus poisoning is suppressed, compared to the prior art, as the catalytic performance after endurance to phosphorus poisoning is improved by the addition of zirconia, compared to ceria alone. However, catalytic performance of any of the catalysts deteriorates after being subjected to phosphorus poisoning, and their suppressing effect is not sufficient.

The present invention does not suppress phosphorus poisoning itself but suppresses deterioration in catalytic performance even in a state where a large amount of phosphorus adheres to the catalyst.

Further, since a large amount of the phosphorus compound adheres to an inflow side with respect to an exhaust gas flowing direction, it is considered that, in the catalyst according to Patent Literature 2, the catalytic performance deterioration can be suppressed by providing a portion on where no catalytic material is coated at the inflow side. However, there is no description in Examples on the catalytic performance after the phosphorus poisoning, and the effect thereof is not clear. Further, depending on traveling distance, a large amount of the phosphorus compound adheres to the vicinity of a catalyst outlet at an outflow side and thus the performance is considered to be deteriorated. Therefore, it is hard to say that Patent Literature 2 proposes a sufficient countermeasure from the viewpoint of long-term durability.

According to the catalyst coating configuration of Patent Literature 3, it is disclosed that exhaust gas is likely to be diffused to the lower catalyst layer by a Pd single layer zone at the inflow side. As described above, however, it is considered that since a large amount of the phosphorus compound adheres to the inflow side, in particular, the performance of the Pd single layer zone, which has high reactivity with phosphorus is likely to deteriorate under phosphorus compound adherence.

Therefore, an object of the present invention is to provide an exhaust gas purification catalyst that suppresses performance deterioration due to phosphorus poisoning after long-term use of the catalyst and that has improved durability of exhaust gas purification performance.

Solution to Problem

The above-mentioned objective of the present invention is accomplished by the following means. In the present specification, the expression "A to B" means "not less than A, but not more than B". For example, in the present specification, "1% by weight to 30% by weight" or "1 to 30% by weight" means "not less than 1% by weight, but not more than 30% by weight". In the present specification, the terms "weight" and "mass" are equivalent. Further, each of various physical properties described in the present specification is a value measured by a corresponding method described in the following Examples, unless otherwise noted.

(1) A catalyst for purification of exhaust gas containing a phosphorus compound including: a lower catalyst layer containing at least one of noble metal provided on a refractory three-dimensional structure; and an upper catalyst layer at an inflow side of exhaust gas and an upper catalyst layer at an outflow side of exhaust gas provided on a surface of the lower catalyst layer, wherein the upper catalyst layer at the inflow side and the upper catalyst layer at the outflow side have different concentrations of noble metal, an intermediate zone with a length of 3 to 23% of the overall length of the refractory three-dimensional structure provided between the upper catalyst layer at the inflow side and the upper catalyst layer at the outflow side, and the intermediate zone starting from a position of 10 to 38% from an end face of the catalyst at the inflow side of exhaust gas.

(2) The catalyst according to (1), wherein the intermediate zone has one layer less than the upper catalyst layer at the inflow side and the upper catalyst layer at the outflow side.

(3) The catalyst according to (1) or (2), wherein the noble metal is at least one selected from rhodium, palladium, and platinum.

(4) The catalyst according to any one of (1) to (3), wherein the upper catalyst layer at the inflow side and the upper catalyst layer at the outflow side contain at least rhodium, and the upper catalyst layer at the inflow side has a higher rhodium concentration than the upper catalyst layer at the outflow side.

(5) The catalyst according to any one of (1) to (4), wherein the upper catalyst layer at the inflow side and the upper catalyst layer at the outflow side further contain palladium.

(6) The catalyst according to (5), wherein a mass ratio of the palladium to the rhodium in the upper catalyst layers is from 0.05 to 5.0.

(7) The catalyst according to any one of (1) to (6), wherein the lower catalyst layer contains at least palladium.

(8) A method for purification of exhaust gas including purifying a phosphorus compound-containing exhaust gas using the catalyst according to any one of (1) to (7).

(9) A method for purification of exhaust gas including purifying a phosphorus compound-containing exhaust gas using the catalyst according to any one of (1) to (7) by depositing a phosphorus compound in the intermediate zone.

Advantageous Effect of Invention

According to the present invention, even if the catalyst is exposed to exhaust gas containing a phosphorus compound at high temperature and for a long time, the catalyst can maintain high purification performance over a long time for carbon monoxide (CO), hydrocarbon (HC), and nitrogen oxide (NOx) which are contained in the exhaust gas.

DESCRIPTION OF EMBODIMENTS

Figure 1:
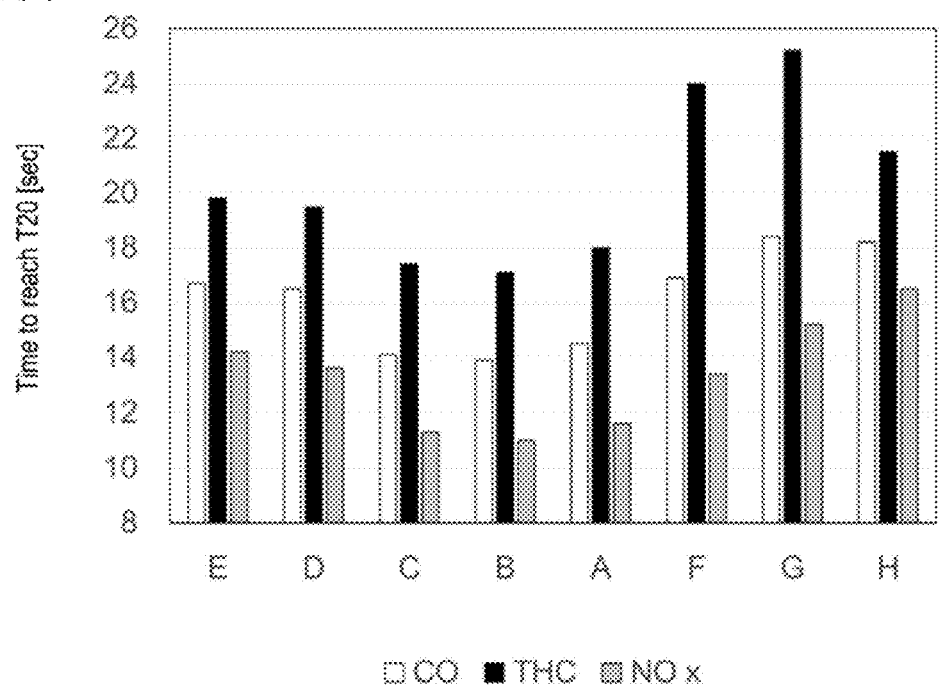
FIG. 1 is a graph showing time to reach T20 of the catalyst in the Examples of the present invention and the Comparative Examples.

The catalyst for purification of phosphorus compound-containing exhaust gas according to the present invention has a lower catalyst layer containing at least one of noble metal provided on a refractory three-dimensional structure; an upper catalyst layer at an inflow side of exhaust gas and an upper catalyst layer at an outflow side thereof, provided on a surface of the lower catalyst layer, the upper catalyst layer at the inflow side and the upper catalyst layer at the outflow side having different concentrations of noble metal; and has an intermediate zone with a length of 3 to 23% of the overall length of the refractory three-dimensional structure provided between the upper catalyst layer at the inflow side and the upper catalyst layer at the outflow side, the intermediate zone starting from a position 10 to 38% from an end face of the catalyst at the inflow side of exhaust gas.

Here, the length of each of the catalyst layers is defined as an average value of the shortest length of the catalyst layer (Lmin) and the longest length thereof (Lmax) (i.e., (Lmin+Lmax)/2). There may be one or more catalyst layers between the three-dimensional structure and the lower catalyst layer. Further, there may be one or more catalyst layers between the upper catalyst layer and the lower catalyst layer.

The refractory three-dimensional structure is not particularly limited, and those generally used in the field of exhaust gas purification catalyst can be appropriately employed, or preferably a honeycomb substrate. Examples of the honeycomb substrate include a monolithic honeycomb substrate, a metal honeycomb substrate, and a plug honeycomb substrate such as a particulate filter. As a material thereof, cordierite, silicon carbide, silicon nitride, or heat-resistant metal such as stainless steel and a Fe—Cr—Al alloy may be used.

These honeycomb substrates can be produced by an extrusion molding method, a method of winding tightly a sheet-shaped element, or the like. The shape of a gas passing port (cell shape) may have any of hexagonal, square, triangular, and corrugation shapes. In view of usability, the cell density (cell number/unit cross-sectional area) of 100 to 1200 cells/in$^2$ (15.5 to 186 cells/cm$^2$) is satisfactory, and 200 to 900 cells/in$^2$ (31 to 139.5 cells/cm$^2$) is preferable.

The overall length of the refractory three-dimensional structure is from 10 to 1000 mm, preferably from 15 to 300 mm, and more preferably from 30 to 200 mm.

The intermediate zone is a zone where the upper catalyst layer at the inflow side and the upper catalyst layer at the outflow side are substantially not present. The state of being substantially not present includes a state of being supported without being affected as catalysis and/or a state of being involuntarily supported at the time of preparing a catalyst. The intermediate zone is provided at a ratio of its length to the overall length of the refractory three-dimensional structure of 3 to 23%, preferably 3.0 to 23%, more preferably 3 to 15%, further preferably 3.0 to 15%, particularly preferably 4.5 to 9.5%. The ratio of the length of the intermediate zone to the overall length of the catalyst is hereinafter simply referred to as "ratio". The intermediate zone starts from a position 10 to 38%, preferably 12 to 35%, more preferably 14 to 33%, from the end face of the catalyst at the inflow side of exhaust gas. Specifically, the intermediate zone is provided from a position of preferably 11 to 44 mm, more preferably 13 to 38 mm, further preferably 15 to 35 mm from the end face of the refractory three-dimensional structure at the inflow side of exhaust gas.

The thickness of the catalyst layer from the surface of the refractory three-dimensional structure to the surface of the intermediate zone is preferably smaller than the thickness from the surface of the refractory three-dimensional structure to the surface of the upper catalyst layer at the inflow side. In addition, the thickness of the catalyst layer from the surface of the refractory three-dimensional structure to the surface of the intermediate zone is preferably smaller than the thickness from the surface of the refractory three-dimensional structure to the surface of the upper catalyst layer at the outflow side. Each of the thicknesses from the surface of the refractory three-dimensional structure to the surface of the upper catalyst layer at the inflow side and from the surface thereof to the upper catalyst layer at the outflow side can be set to the maximum value in each of the layers. In addition, the thickness of the catalyst layer from the surface of the refractory three-dimensional structure to the surface of the intermediate zone can be set to the minimum value in the intermediate zone portion.

The thickness of each of the catalyst layers is defined as an average value of the smallest thickness of the catalyst layer (Hmin) and the greatest thickness thereof (Hmax) (i.e., (Hmin+Hmax)/2). The thickness of each catalyst layer is not necessarily uniform throughout the layer, but is preferably substantially uniform almost entirely. It is considered that such a configuration can suppress the deterioration of catalytic activity due to the deposition of phosphorus compounds contained in the phosphorus compound-containing exhaust gas in the intermediate zone.

The noble metal used in the present invention may be those used in the exhaust gas purification catalyst, and is preferably rhodium, palladium, or platinum. The noble metal may be used alone or in combination, and may be used in combination of the same kind or different kinds for each catalyst layer. Specifically, the following configuration is preferable.

As the noble metal used in the lower catalyst layer, palladium, rhodium, or platinum is preferable; palladium or platinum is particularly preferable; and palladium is most preferable.

As noble metal used in the upper catalyst layer at the inflow side and the upper catalyst layer at the outflow side, palladium, rhodium, or platinum is preferable; rhodium or palladium is particularly preferable; and rhodium is most preferable. The rhodium concentration in the upper catalyst layer at the inflow side is preferably 1.1 to 5 times, more preferably 1.1 to 2 times, further preferably 1.1 to 1.35 times that of the upper catalyst layer at the outflow side. Here, the rhodium concentration in each layer is expressed as percentage obtained by dividing the mass of rhodium contained in the layer by the total mass of a solid contained in the layer. When the ratio thereof is 1.1 times or more, sufficient warming-up properties are exhibited, which is preferable. When the ratio thereof is 5 times or less, the deterioration of catalytic performance due to phosphorus poisoning is suppressed, which is preferable. The mass ratio of palladium to rhodium in the upper catalyst layer at the inflow side is preferably from 0.05 to 5.0, more preferably from 0.1 to 2.0, and further preferably from 0.3 to 0.8. When the ratio thereof is 0.05 or more, rhodium is less susceptible to phosphorus poisoning owing to palladium in the upper catalyst layer at the inflow side, which is preferable. When the ratio thereof is 5.0 or less, the deterioration of the reaction of rhodium caused by coating of rhodium with palladium is suppressed, which is preferable.

In the amount of the noble metal supported by the lower catalyst layer, the upper catalyst layer at the inflow side, and the upper catalyst layer at the outflow side, the amount of palladium is from 0.05 to 20 g, preferably from 0.5 to 15 g, further preferably from 1 to 10 g, per 1 L of the refractory three-dimensional structure. The amount of platinum is from 0.01 to 15 g, preferably from 0.1 to 10 g, further preferably from 0.5 to 5 g, per 1 L of the refractory three-dimensional structure. The amount of rhodium is from 0.01 to 10 g, preferably from 0.05 to 8 g, further preferably from 0.1 to 5 g, per 1 L of the refractory three-dimensional structure.

There is no particular limitation on a rhodium (Rh) source as a starting material, and raw materials used in the field of exhaust gas purification can be used. Specific examples thereof include rhodium; halides such as rhodium chloride; inorganic salts of rhodium, such as nitrate, sulfate, acetate, ammonium salt, amine salt, hexaammine salt, carbonate, bicarbonate, nitrite, and oxalate; carboxylates such as formate; hydroxide, alkoxide, and oxide. Preferably, nitrate, ammonium salt, amine salt, and carbonate are exemplified. Here, the amount of the rhodium source added is such an amount as to lead to the amount of rhodium supported on a refractory three-dimensional structure as described above. Incidentally, in the present invention, the rhodium sources described above may be used singly or as a mixture of two or more kinds.

There is no particular limitation on a palladium (Pd) source as a starting material, and raw materials used in the field of exhaust gas purification can be used. Specific examples thereof include palladium; halides such as palladium chloride; inorganic salts of palladium, such as nitrate, sulfate, acetate, ammonium salt, amine salt, tetraammine salt, carbonate, bicarbonate, nitrite, and oxalate; carboxylates such as formate; hydroxide, alkoxide, and oxide. Preferably, nitrate, acetate, ammonium salt, amine salt, tetraammine salt, and carbonate are exemplified. Incidentally, in the present invention, the palladium sources described above may be used singly or as a mixture of two or more kinds. Here, the amount of the palladium source added is such an amount as to lead to the amount of palladium supported on a refractory three-dimensional structure as described above. Incidentally, in the present invention, the palladium sources described above may be used singly or as a mixture of two or more kinds.

Further, in the case where platinum is contained as a catalyst active component, there is no particular limitation on a platinum (Pt) source as a starting material, and raw materials used in the field of exhaust gas purification can be used. Specific examples thereof include platinum; halides such as platinum bromide and platinum chloride; inorganic salts of platinum, such as nitrate, dinitrodiammine salt, tetraammine salt, sulfate, ammonium salt, amine salt, bisethanolamine salt, bisacetylacetonate salt, carbonate, bicarbonate, nitrite and oxalate; carboxylates such as formate; hydroxides; alkoxides; and oxides. Among them, nitrate (platinum nitrate), dinitrodiammine salt (dinitrodiammine platinum), chloride (platinum chloride), tetraammine salt (tetraammine platinum), bisethanolamine salt (bisethanolamine platinum), and bisacetylacetonate salt (platinum bisacetylacetonate) are preferable. Incidentally, in the present invention, the platinum sources described above may be used singly or as a mixture of two or more kinds. Here, the amount of the platinum source added is such an amount as to lead to the amount of platinum supported on a three-dimensional structure as described above.

These upper and lower catalyst layers may use, in addition to the noble metals, oxygen storage material, refractory inorganic oxide, oxide of a group I element, oxide of a group II element, sulfate, carbonate, nitrate, or the like. The oxygen storage material is a material capable of taking in or discharging oxygen according to the oxygen concentration in the exhaust gas, and examples thereof include cerium oxide; and oxide composed of cerium and other elements, such as cerium-zirconium composite oxide, cerium-zirconium-lanthanum composite oxide, cerium-zirconium-lanthanum-neodymium composite oxide, and cerium-zirconium-lanthanum-yttrium composite oxide.

The oxygen storage material has a crystal structure of cubic, tetragonal, monoclinic, or orthorhombic system; preferably cubic, tetragonal, or monoclinic system; and more preferably cubic or tetragonal system.

There is no particular limitation on a cerium raw material such as cerium-zirconium composite oxide used as an oxygen storage material, and raw materials used in the field of exhaust gas purification can be used. Specific examples thereof include nitrate such as cerous nitrate, carbonate, and sulfate. Among them, nitrate is preferably used. Incidentally, in the present invention, the cerium sources described above may be used singly or as a mixture of two or more kinds. Here, the amount of the cerium source added is preferably from 5 to 200 g, more preferably from 5 to 100 g, further preferably from 5 to 50 g, in terms of cerium oxide ($CeO_2$), per 1 L of the refractory three-dimensional structure.

There is no particular limitation on a zirconium raw material, and raw materials used in the field of exhaust gas purification can be used. Specific examples thereof include zirconium oxynitrate, zirconium oxychloride, zirconium nitrate, and basic zirconium sulfate. Among them, zirconium oxynitrate and zirconium nitrate are preferably used. Incidentally, in the present invention, the zirconium sources described above may be used singly or as a mixture of two or more kinds. Here, the amount of zirconium source added is preferably from 5 to 200 g, more preferably from 10 to 150 g, further preferably from 20 to 100 g, in terms of zirconium oxide ($ZrO_2$), per 1 L of the refractory three-dimensional structure.

There is no particular limitation on a lanthanum raw material, and raw materials used in the field of exhaust gas purification can be used. Specific examples thereof include lanthanum hydroxide, lanthanum nitrate, lanthanum acetate, and lanthanum oxide. Among them, lanthanum nitrate or lanthanum hydroxide is preferable. Incidentally, in the present invention, the lanthanum sources described above may be used singly or as a mixture of two or more kinds. Here, the amount of the lanthanum source added is preferably from 1 to 50 g, more preferably from 1 to 35 g, further preferably from 1 to 20 g, in terms of lanthanum oxide ($La_2O_3$), per 1 L of the refractory three-dimensional structure.

There is no particular limitation on an yttria raw material, and raw materials used in the field of exhaust gas purification can be used. Specific examples thereof include yttrium hydroxide, yttrium nitrate, yttrium oxalate, and yttrium sulfate. Among them, yttrium hydroxide and yttrium nitrate are preferably used. Incidentally, in the present invention, the yttrium sources described above may be used singly or as a mixture of two or more kinds. Here, the amount of the yttrium source added is preferably from 0 to 50 g, more preferably from 0 to 35 g, further preferably from 0 to 20 g, in terms of yttrium oxide ($Y_2O_3$), per 1 L of the refractory three-dimensional structure.

There is no particular limitation on a neodymium raw material, and raw materials used in the field of exhaust gas purification can be used. Specific examples thereof include neodymium hydroxide, neodymium nitrate, neodymium oxalate, and neodymium sulfate. Among them, neodymium hydroxide and neodymium nitrate are preferably used. Incidentally, in the present invention, the neodymium sources described above may be used singly or as a mixture of two or more kinds. Here, the amount of the neodymium source added is preferably from 0 to 50 g, more preferably from 0 to 35 g, further preferably from 0 to 20 g, in terms of neodymium oxide ($Nd_2O_5$), per 1 L of the refractory three-dimensional structure.

As the refractory inorganic oxide, alumina, lanthanum-containing alumina, zirconia, silica-alumina, titania, and zeolite are included and can be used singly or in a form of a mixture of two or more kinds. The refractory inorganic oxide to be used in the present invention is preferably one having a little variation of specific surface area at a temperature of 700° C. or higher, preferably 1000° C. or higher. A BET specific surface area of the refractory inorganic oxide is not particularly limited, and is preferably 50 to 750 $m^2/g$, and more preferably 150 to 750 $m^2/g$, from the viewpoint of supporting a catalyst active component such as a noble metal. The average primary particle diameter of the refractory inorganic oxide is not particularly limited, but for example, is in a range of 5 nm to 20 nm, and more preferably 5 nm to 10 nm. Within such a range, it is possible to support a noble metal on the refractory inorganic oxide. Incidentally, the shape or the average primary particle diameter of the refractory inorganic oxide in the present invention can be measured by a known method such as a transmission electron microscope (TEM).

As the group I element or the group II element, potassium, magnesium, calcium, strontium, and barium are included and can be used singly or in a form of a mixture of two or more kinds. The group I element or the group II element to be used in the present invention can be used in a form of oxide, sulfate, carbonate, or nitrate, and is preferably oxide, sulfate, or carbonate after calcining the catalyst. As a barium sulfate, $BaSO_4$ can be used, and the amount of barium sulfate added is preferably from 0 to 50 g, more preferably from 0.5 to 30 g, further preferably from 0.5 to 20 g, in terms of $BaSO_4$, per 1 L of the refractory three-dimensional structure.

Further, in the case where the catalyst of the present invention contains a refractory inorganic oxide, cerium, a ceria-zirconia composite oxide, a rare-earth metal, or an alkaline earth metal, each of these components as a starting material may be used in a form as it is, or in another form, but preferably used in a form as it is. The amount of each of the above-described components added is such an amount as to lead to the amount of the component supported on a three-dimensional structure as described above, or to the amount of the component existing in the catalyst as described above.

The method of producing the catalyst of the present invention is not particularly limited as long as the effect of the present invention is achieved, and a known method can be used. The catalyst is preferably produced by a method including the steps of (1) preparing a slurry containing noble metal, oxygen storage material, refractory oxygen storage material other than the oxygen storage material, a group I element and/or a group II element; (2) coating a refractory three-dimensional structure with the slurry; and (3) drying and/or calcining the coated structure.

The slurry can be obtained by mixing a refractory inorganic oxide, an oxygen storage material, a noble metal-supported refractory inorganic oxide, or a noble metal-supported oxygen storage material with an aqueous medium, and wet-milling the mixture. Examples of such an aqueous medium include water, lower alcohols such as ethanol and 2-propanol, and organic alkali aqueous solutions. Water or a lower alcohol is preferably used, and water is particularly preferably used. The amount of a solid in the slurry is such an amount as to lead to be 5 to 60% by mass, and more preferably 10 to 50% by mass, relative to the slurry. A method of wet-milling is carried out generally according to a known method, and there is no particular limitation thereon. For example, wet-milling is carried out using a ball mill or the like.

The method of coating a refractory three-dimensional structure with a slurry may be (a) a method of coating the refractory three-dimensional structure with a slurry to be used in a lower catalyst layer, drying and calcining the coated structure, then coating a slurry to be used in an upper catalyst layer at an inflow side of exhaust gas from the inflow side of the structure, drying and calcining the coated structure, and then coating a slurry to be used in an upper catalyst layer at an outflow side of exhaust gas from the outflow side of the structure, drying and calcining the coated structure; (b) a method of coating the refractory three-dimensional structure with a slurry to be used in a lower catalyst layer, drying and calcining the coated structure, then coating a slurry to be used in an upper catalyst layer at an outflow side of exhaust gas from the outflow side of the structure, drying and calcining the coated structure, and then coating a slurry to be used in an upper catalyst layer at an inflow side of exhaust gas from the inflow side of the structure, drying and calcining the coated structure; or (c) a method of coating the refractory three-dimensional structure with a slurry to be used in a lower catalyst layer, drying and calcining the coated structure, then simultaneously coating the refractory three-dimensional structure with a slurry to be used in an upper catalyst layer at an inflow side of exhaust gas from the inflow side of the structure and a slurry to be used in an upper catalyst layer at an outflow side of exhaust gas from the outflow side of the structure, drying and calcining the coated structure. A catalyst can be obtained by combining these methods when each of the catalyst layers is formed.

As the method of forming an intermediate zone when the above-mentioned catalyst is prepared, the coating state of each slurry and the length of the formed layers are measured in advance to determine the formation states of the upper catalyst layer at the inflow side and the upper catalyst layer at the outflow side, so that an intermediate zone at a predetermined position and with a predetermined length can be formed. For measurement of the predetermined position and length of the intermediate zone, the catalyst is destroyed and a microscope such as a vernier caliper or a microscope can be used. Alternatively, the position or the length of the intermediate zone can be measured using an X-ray CT scanner without destroying the catalyst. Whether the catalyst is destroyed or not, any method can be used as long as the intermediate zone can be measured.

The slurry obtained according to the above-mentioned steps is coated on the refractory three-dimensional structure, and the coated structure is dried and calcined. Regarding the conditions for drying and calcining, as long as the refractory inorganic oxide can adhered to the refractory three-dimensional structure, and for example, drying and calcining are not particularly distinguished. Either of drying or calcining alone may be sufficient, but the structure is preferably dried in the air at a temperature of 50 to 300° C., further preferably 80 to 200° C. for 5 minutes to 10 hours, preferably for 30 minutes to 8 hours. Subsequently, the structure is calcined at a temperature of 300 to 1200° C., preferably 400 to 700° C. for 10 minutes to 10 hours, preferably 30 minutes to 5 hours.

The exhaust gas to be effective in the present invention is exhaust gas containing a phosphorus compound from an internal combustion engine, and even in the case where the catalyst of the present invention is exposed to the phosphorus compound in the exhaust gas for a long time, the exhaust gas can be purified. The phosphorus compound is deposited as phosphorus oxide ($P_2O_5$) on the catalyst exposed to the exhaust gas containing the phosphorus compound. According to the present invention, the catalyst can exhibit excellent exhaust gas purification performance even in a state where a phosphorous compound is accumulated on the catalyst in an amount of 1 g to 50 g, effectively 1 g to 30 g, further effectively 1 g to 15 g, and most effectively 1 g to 10 g, per 1 L of the refractory three-dimensional structure. Even though the phosphorus compound is generated on the upper catalyst layer at the inflow side, it is deposited in the intermediate zone (space portion), so that the activity of the catalyst component on the upper catalyst layer at the outflow side is less affected, which provides high purification capacity for a whole catalyst. The ratio of the amount of phosphorus compound deposited in terms of $P_2O_5$ to the volume of phosphorus compound deposited in the intermediate zone as phosphorus oxide ($P_2O_5$) is larger than the ratio of the amount of phosphorus compound deposited to the volume of phosphorus compound at the outflow side in terms of $P_2O_5$ deposited on the upper catalyst layer at the outflow side.

Further, when the catalyst is coated on a refractory three-dimensional structure, the above-mentioned phosphorus compound is generally deposited in a high concentration on the surface of the catalyst layer. That is, the concentration distribution of the phosphorus compound at the inside of the catalyst layer in the depth direction is uneven, and the concentration of the phosphorus compound becomes lower toward the refractory three-dimensional structure, while the concentration thereof becomes higher towards the upper most surface of the coat layer which comes in contact with a gaseous layer. Meanwhile, the concentration distribution of the phosphorus compound in the exhaust gas flowing direction is also uneven, and generally, the concentration of the phosphorus compound becomes higher toward the end face at the inflow side, while the concentration thereof becomes lower toward the end face at the outflow side, so that the concentration does not specifically become higher between the end face at the inflow side and the end face at the outflow side. However, since the catalyst of the present invention has the intermediate zone with a predetermined length provided at a predetermined position in the exhaust gas flowing direction, the amount of phosphorus compound deposited in the position of the intermediate zone is larger than that deposited without the intermediate zone. When the ratio of the total amount of phosphorus compound deposited in the intermediate zone to the amount of phosphorus compound deposited on the whole part is defined as an intermediate zone deposition rate, the phosphorus compound having an intermediate zone deposition rate of 12% to 30% is preferably deposited to purify exhaust gas, and the phosphorus compound having an intermediate zone deposition rate of 15% to 25% is more preferably deposited to purify exhaust gas.

Further, a large amount of the phosphorus compound is deposited on a side closer to the end face at the outflow side in the intermediate zone, which suppresses the deposition of the phosphorus compound toward the outflow side from the side closer to the end face at the outflow side. Therefore, in particular, the catalyst component at the outflow side could be less likely to be affected by poisoning due to the phosphorus compound. For this reason, the catalyst according to the present invention can be preferably used in purifying the exhaust gas containing a phosphorus compound of the internal combustion engine, and in particular, exhibits an excellent effect in purification of nitrogen oxide, carbon monoxide, and hydrocarbon which are contained in the exhaust gas from an internal combustion engine such as a gasoline engine.

The amount of the phosphorus compound deposited on the catalyst can be analyzed using XRF (X-ray fluorescence analysis), EPMA (electron probe microanalyzer), SEM-EDX, or the like. In the case of studying distribution of the catalyst in the exhaust gas flowing direction, the catalyst is cut into a predetermined length, and the amount of the phosphorus compound at each of the cut parts can be analyzed by the XRF or the like. The distribution of the catalyst can be studied by comparing the analysis results at the cut parts.

The internal combustion engine is not particularly limited. For example, a gasoline engine, a hybrid engine, or an engine using a fuel such as natural gas, ethanol, or dimethyl ether can be used. Among them, a gasoline engine is preferably used as the internal combustion engine.

The time for exposing the exhaust gas purification catalyst to the exhaust gas is not particularly limited, but it is sufficient to secure a time for which at least part of the exhaust gas purification catalyst can be brought into contact with the exhaust gas.

The temperature of the exhaust gas is not particularly limited and is preferably 0° C. to 800° C., that is, in a temperature range of the exhaust gas during normal driving. Here, an air/fuel ratio of the exhaust gas having a temperature of 0° C. to 800° C. of the internal combustion engine is 10 or more but less than 30, and preferably 11 to 14.7.

The catalyst of the present invention as described above or the catalyst produced by the method as described above may be exposed to exhaust gas having a temperature of 800 to 1200° C. Here, the air/fuel ratio of the exhaust gas having a temperature of 800 to 1200° C. is preferably 10 to 18.6. In addition, the time for exposing the exhaust gas purification catalyst to exhaust gas having a temperature of 800° C. to 1200° C. is not particularly limited and may be, for example, 5 to 500 hours. The catalyst of the present invention has high performance even after being exposed to such exhaust gas having a high temperature. In order to examine the exhaust gas purification performance of the catalyst after exposure to the exhaust gas having a high temperature, it is effective to examine the exhaust gas purification performance after the catalyst is exposed to exhaust gas having a temperature of 800° C. to 1200° C. for 5 to 500 hours as a heat treatment.

EXAMPLES

The effect of the present invention will be described with reference to the following Examples and Comparative Examples. However, the technical scope of the present invention is not limited to only the following Examples.

Example 1

Each of an aqueous solution of palladium nitrate, a $CeO_2$—$ZrO_2$ composite oxide, aluminum oxide ($Al_2O_3$), lanthanum acetate, and barium sulfate was weighed such that a mass ratio of palladium (Pd):$CeO_2$—$ZrO_2$ composite oxide:$Al_2O_3$:barium sulfate ($BaSO_4$):lanthanum oxide would be 0.3:50:48:6:5, and then was wet-milled, to prepare a slurry a. The prepared slurry a as a refractory three-dimensional structure was coated onto a 0.875 L cylindrical cordierite substrate of 103-mm diameter and 105-mm length having 600 cells per square inch (1 inch=25.4 mm) and a thickness of each cell wall of 2.5 mil (1 mil=0.0254 mm) in an amount in which the amount of the slurry supported after calcination would be 109.3 g/L, dried at 150° C. for 15 minutes, and then calcined at 550° C. for 30 minutes, to yield an A0 having a lower catalyst layer provided on the refractory three-dimensional structure. The lower catalyst layer was disposed from an end face of the refractory three-dimensional structure at an inflow side of exhaust gas to an end face thereof at an outflow side of exhaust gas (from the end face at the inflow side of exhaust gas to the position of 100% of the overall length of the refractory three-dimensional structure).

Next, each of a $CeO_2$—$ZrO_2$ composite oxide, aluminum oxide, and lanthanum oxide was weighed such that a mass ratio of $CeO_2$—$ZrO_2$ composite oxide:$Al_2O_3$:$La_2O_3$ would be 57:61:1.5, and then was wet-milled, to prepare a slurry b. Each of an aqueous solution of rhodium nitrate, an aqueous solution of palladium nitrate, and the prepared slurry b was weighed such that a mass ratio of rhodium (Rh):palladium (Pd):(the total amount of $CeO_2$—$ZrO_2$ composite oxide, $Al_2O_3$ and $La_2O_3$ contained in the slurry b) would be 0.17:0.08:29.4, and then mixed to prepare a slurry b1.

Next, each of an aqueous solution of rhodium nitrate, an aqueous solution of palladium nitrate, and the prepared slurry b was weighed such that a weight ratio of rhodium (Rh):palladium (Pd):(the total amount of $CeO_2$—$ZrO_2$ composite oxide, $Al_2O_3$ and $La_2O_3$ contained in the slurry b) would be 0.23:0.12:90.1, and then mixed to prepare a slurry b2.

The prepared slurry b1 was coated on A0 from the inflow side of the catalyst to 25 mm in an amount in which the amount of the slurry supported after calcination would be 29.65 g per 1 L of the substrate, dried, and then calcined to yield A1. Next, the slurry b2 was coated on A1 from the end face at the outflow side to a length of 65 mm as an upper catalyst layer at the outflow side in an amount of 90.45 g per 1 L of the substrate, dried, and then calcined. This yielded a catalyst A having an intermediate zone with a length of 15 mm (at a ratio of 14.3%, the ratio of the length of the intermediate zone to the overall length of the catalyst (hereinafter simply referred to as "ratio")) in which the lower layer was exposed between the upper catalyst layer at the inflow side and the upper catalyst layer at the outflow side. The rhodium concentration in the upper catalyst layer at the inflow side was 0.57% by mass, and the rhodium concentration in the upper catalyst layer at the outflow side was 0.25% by mass. The mass ratio of palladium to rhodium in the upper catalyst layer at the inflow side was 0.47, and the mass ratio of palladium to rhodium in the upper catalyst layer at the outflow side was 0.52.

Example 2

The slurry b2 was coated on the A1 obtained in Example 1 from the end face at the outflow side to a length of 70 mm in an amount of 90.45 g per 1 L of the substrate, dried, and then calcined. This yielded a catalyst B having an intermediate zone with a length of 10 mm (at a ratio of 9.5%) in which the lower layer was exposed between the upper catalyst layer at the inflow side and the upper catalyst layer at the outflow side.

Example 3

The slurry b2 was coated on the A1 obtained in Example 1 from the end face at the outflow side to a length of 75 mm in an amount of 90.45 g per 1 L of the substrate, dried, and then calcined. This yielded a catalyst C having an intermediate zone with a length of 5 mm (at a ratio of 4.8%) in which the lower layer was exposed between the upper catalyst layer at the inflow side and the upper catalyst layer at the outflow side.

Comparative Example 1

The slurry b2 was coated on the A1 obtained in Example 1 from the end face at the outflow side to a length of 77 mm in an amount of 90.45 g per 1 L of the substrate, dried, and then calcined. This yielded a catalyst D having an intermediate zone with a length of 3 mm (at a ratio of 2.9%) in which the lower layer was exposed between the upper catalyst layer at the inflow side and the upper catalyst layer at the outflow side.

Comparative Example 2

The slurry b2 was coated on the A1 obtained in Example 1 from the end face at the outflow side to a length of 80 mm in an amount of 90.45 g per 1 L of the substrate, dried, and then calcined. This yielded a catalyst E without an intermediate zone in which the lower layer was exposed between the upper catalyst layer at the inflow side and the upper catalyst layer at the outflow side.

Comparative Example 3

The slurry b2 was coated on the A1 obtained in Example 1 from the end face at the outflow side to a length of 55 mm in an amount of 90.45 g per 1 L of the substrate, dried, and then calcined. This yielded a catalyst F having an intermediate zone with a length of 25 mm (at a ratio of 23.8%) in which the lower layer was exposed between the upper catalyst layer at the inflow side and the upper catalyst layer at the outflow side.

Comparative Example 4

The slurry b2 was coated on the A1 obtained in Example 1 from the end face at the outflow side to a length of 50 mm in an amount of 90.45 g per 1 L of the substrate, dried, and then calcined. This yielded a catalyst G having an intermediate zone with a length of 30 mm (at a ratio of 28.6%) in which the lower layer was exposed between the upper catalyst layer at the inflow side and the upper catalyst layer at the outflow side.

Comparative Example 5

Each of an aqueous solution of rhodium nitrate, an aqueous solution of palladium nitrate, and the slurry b was weighed such that a weight ratio of rhodium (Rh):palladium (Pd):(the total amount of $CeO_2$—$ZrO_2$ composite oxide, $Al_2O_3$ and $La_2O_3$ contained in the slurry b) would be 0.4:0.2:119.5, and then mixed to prepare a slurry b3. The slurry b3 was coated from the end face of the A0 obtained in Example 1 at the inflow side to the end face thereof at the outflow side in an amount of 120.1 g per 1 L of the substrate, dried, and then calcined. This yielded a catalyst H having no noble metal distributed from the inflow side to the outflow side and not having an intermediate zone.

Comparative Example 6

The slurry b1 obtained in Example 1 was coated on the A0 obtained in Example 1 from the inflow side of the catalyst to 10 mm in an amount in which the amount of the slurry supported after calcination would be 29.65 g per 1 L of the substrate, dried, and then calcined to yield I1. Next, the slurry b2 was coated on I1 from the end face at the outflow side to a length of 85 mm in an amount of 90.45 g per 1 L of the substrate, dried, and then calcined. This yielded a catalyst I having an intermediate zone with a length of 10 mm (at a ratio of 9.5%) in which the lower layer was exposed at a position of 10 to 20 mm from the end face at the inflow side.

Example 4

The slurry b1 obtained in Example 1 was coated on the A0 obtained in Example 1 from the inflow side of the catalyst to 15 mm in an amount in which the amount of the slurry supported after calcination would be 29.65 g per 1 L of the substrate, dried, and then calcined to yield J1. Next, the slurry b2 was coated on J1 from the end face at the outflow side to a length of 80 mm, dried, and then calcined. This yielded a catalyst J having an intermediate zone with a length of 10 mm (at a ratio of 9.5%) in which the lower layer was exposed at a position of 15 mm to 25 mm from the end face at the inflow side.

Example 5

The slurry b1 obtained in Example 1 was coated on the A0 obtained in Example 1 from the inflow side of the catalyst to 35 mm in an amount in which the amount of the slurry supported after calcination would be 29.65 g per 1 L of the substrate, dried, and then calcined to yield K1. Next, the slurry b2 was coated on K1 from the end face at the outflow side to a length of 60 mm, dried, and then calcined. This yielded a catalyst K having an intermediate zone with a length of 10 mm (at a ratio of 9.5%) in which the lower layer was exposed at a position of 35 mm to 45 mm from the end face at the inflow side.

Comparative Example 7

The slurry b1 obtained in Example 1 was coated on the A0 obtained in Example 1 from the inflow side of the catalyst to 45 mm in an amount in which the amount of the slurry supported after calcination was 29.65 g per 1 L of the substrate, dried, and then calcined to yield L1. Next, the slurry b2 was coated on L1 from the end face at the outflow side to a length of 50 mm, dried, and then calcined. This yielded a catalyst L having an intermediate zone with a length of 10 mm (at a ratio of 9.5%) in which the lower layer was exposed at a position of 45 mm to 55 mm from the end face at the inflow side.

TABLE 1

Length of Catalyst Layer

| Catalyst | Upper catalyst layer at inflow side [mm] | Intermediate zone [mm] | Upper catalyst layer at outflow side [mm] |
|---|---|---|---|
| A | 25 | 15 | 65 |
| B | 25 | 10 | 70 |
| C | 25 | 5 | 75 |
| D | 25 | 3 | 77 |
| E | 25 | 0 | 80 |
| F | 25 | 25 | 55 |
| G | 25 | 30 | 50 |
| H | | 105 | |
| I | 10 | 10 | 85 |
| J | 15 | 10 | 80 |
| K | 35 | 10 | 60 |
| L | 45 | 10 | 50 |

<Heat Treatment and Phosphorus Poisoning Treatment>

Each of the catalysts A to L obtained in Examples 1 to 5 and Comparative Examples 1 to 7 was positioned 25 cm downstream from an exhaust port of a 4.6-liter V-type eight-cylinder engine, the engine was operated while the A/F of a catalyst entry part was set to 14.6 and the temperature of a catalyst bed part was set to 1000° C. Subsequently, the engine was operated at an A/F of 13.8, and subsequently, a cycle in which the engine was operated while the fuel supply was stopped was repeated, and the operation was performed for 100 hours in total, so that the catalyst was subjected to heat treatment.

Next, each of the heat-treated catalysts was disposed at the downstream side of an exhaust port of a 3.0-liter engine and subjected to phosphorus poisoning treatment by operating the engine while an engine oil having a phosphorus (P) concentration of 3000 ppm was used and the temperature of a catalyst bed part was set to 880° C. It was checked that 2.6 g of the phosphorus compound per 1 L of the three-dimensional structure was contained as phosphorus oxide ($P_2O_5$) in the catalyst by analyzing the content of phosphorus in each catalyst treated in this way with XRF.

<Adhesion Amount of Phosphorus Compound to Exhaust Gas Purification Catalyst>

The distribution of the phosphorous adhesion amounts in catalysts B, E, and F was studied. Regarding the catalysts B, E, and F that were subjected to phosphorus poisoning, each of the catalysts was cut at positions of 25 mm, 35 mm, 50 mm, and 70 mm toward the outflow side direction when its end face at the inflow side of exhaust gas was set to 0 mm, the phosphorus compound (in terms of $P_2O_5$) contained in each of parts 0 to 25 mm, 25 mm to 35 mm, 35 mm to 50 mm, 50 mm to 70 mm, and 70 mm to 105 mm was studied by XRF analysis. Table 2 shows the ratio of the amount of the phosphorus compound deposited in each of the parts to the amount of the phosphorus compound deposited in the whole part of 0 to 105 mm and the ratio of the total amount of the phosphorus compound deposited in the intermediate zone to the amount of the phosphorus compound deposited in the whole part of 0 to 105 mm (hereinafter referred to as intermediate zone deposition rate). According to the table, the catalyst B having an intermediate zone with a length of 10 mm has higher phosphorus compound ratio in the 25 mm to 35 mm part where the intermediate zone is located than the catalyst E without an intermediate zone, and the catalyst F having an intermediate zone with a length of 25 mm has a high phosphorus compound ratio in the 35 to 50 mm part. It is found that the catalyst F has a lower phosphorus adhesion ratio in the 25 mm to 35 mm part that is equivalent to the part 10 mm at the inflow side of the intermediate zone than the 35 to 50 mm part, and has more phosphorus adhered on the outflow side in the intermediate zone along the exhaust gas flow, so that phosphorus is adhered in the intermediate zone.

TABLE 2

Ratio of the phosphorus compound deposited in each part to the phosphorus compound adhered to the whole part

| Catalyst | Length of upper catalyst layer at inflow side [mm] | Length of intermediate zone [mm] | 0-25 [mm] | 25-35 [mm] | 35-50 [mm] | 50-70 [mm] | 70-105 [mm] | Intermediate zone deposition rate [%] |
|---|---|---|---|---|---|---|---|---|
| E | 25 | 0 | 70 | 11 | 11 | 7 | 1 | — |
| B | 25 | 10 | 71 | 16 | 9 | 4 | Below the detection limit | 16 |
| F | 25 | 25 | 72 | 4 | 19 | 4 | 1 | 23 |

<Performance Evaluation of Exhaust Gas Purification Catalyst>

Each of the catalysts after being subjected to phosphorus poisoning treatment was disposed 30 cm downstream from an exhaust port of a 2.4-liter straight-six-cylinder engine, the temperature of the catalyst bed part was increased from 100° C. to 500° C. at a rate of 1800° C./min while the A/F was set to 14.6, the gas emitted from the catalyst outlet was sampled, and each of the purification efficiency of CO, THC, and NOx was calculated. The temperature at which each purification efficiency reaches 20% is denoted as T20, and the time to reach T20 is presented in FIGS. 1 and 2. These Figures mean that the shorter the time to reach T20 after the phosphorus poisoning treatment is, the earlier 20% of the exhaust gas is purified, and show that higher exhaust gas purification performance is exhibited even after the phosphorus poisoning treatment.

Figure 2:
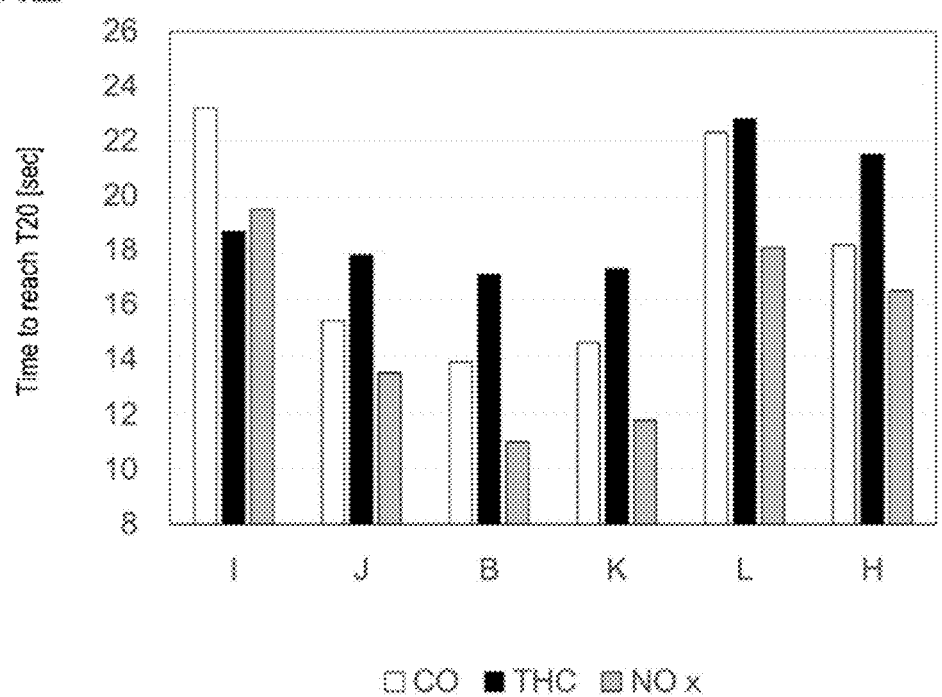
FIG. 2 is a graph showing time to reach T20 of the catalyst in the Examples of the present invention and the Comparative Examples.

The results of FIGS. 1 and 2 show that the catalyst of Examples has high exhaust gas purification performance because it has an intermediate zone with a certain length at a certain position from the inflow side.

The present application is based on Japanese Patent Application No. 2016-142702 filed on Jul. 20, 2016, and the disclosure of which is herein incorporated by reference in its entirety.

The invention claimed is:

1. A catalyst for purification of exhaust gas containing a phosphorus compound comprising: a lower catalyst layer containing at least one of noble metal provided on a refractory three-dimensional structure; and an upper catalyst layer at an inflow side of exhaust gas and an upper catalyst layer at an outflow side of exhaust gas provided on a surface of the lower catalyst layer, wherein;

the upper catalyst layer at the inflow side and the upper catalyst layer at the outflow side having different concentrations of noble metal, an intermediate zone with a length of 3 to 23% of the overall length of the refractory three-dimensional structure provided between the upper catalyst layer at the inflow side and the upper catalyst layer at the outflow side, and the intermediate zone starting from a position 10 to 38% from an end face of the catalyst at the inflow side of exhaust gas.

2. The catalyst according to claim 1, wherein the intermediate zone has one layer less than the upper catalyst layer at the inflow side and the upper catalyst layer at the outflow side.

3. The catalyst according to claim 1, wherein the noble metal is at least one selected from the group consisting of rhodium, palladium, and platinum.

4. The catalyst according to claim 1, wherein the upper catalyst layer at the inflow side and the upper catalyst layer at the outflow side contain at least rhodium, and the upper catalyst layer at the inflow side has a higher rhodium concentration than the upper catalyst layer at the outflow side.

5. The catalyst according to claim 1, wherein the upper catalyst layer at the inflow side and the upper catalyst layer at the outflow side further contain palladium.

6. The catalyst according to claim 5, wherein a mass ratio of the palladium to the rhodium in the upper catalyst layers is from 0.05 to 5.0.

7. The catalyst according to claim 1, wherein the lower catalyst layer contains at least palladium.

8. The catalyst according to claim 1, wherein the intermediate zone is provided at a length of 3 to 15% of the overall length of the refractory three-dimensional structure.

9. The catalyst according to claim 1, wherein the intermediate zone is provided at a length of 4.5 to 9.5% of the overall length of the refractory three-dimensional structure.

10. The catalyst according to claim 1, wherein the intermediate zone starts from a position 12 to 35% from an end face of the catalyst at the inflow side of exhaust gas.

11. The catalyst according to claim 1, wherein the intermediate zone starts from a position 14 to 33% from an end face of the catalyst at the inflow side of exhaust gas.

12. The catalyst according to claim 1, wherein the lower catalyst layer further comprises an oxygen storage material over the overall length of the refractory three-dimensional structure.

13. The catalyst according to claim 12, wherein the oxygen storage material comprises cerium oxide.

14. The catalyst according to claim 1, wherein the upper catalyst layer at the outflow side of exhaust gas further comprises cerium oxide.

15. The catalyst according to claim 1, wherein the intermediate zone is a zone where the upper catalyst layer at the inflow side and the upper catalyst layer at the outflow side are not present.

16. A method for purification of exhaust gas containing a phosphorus compound using the catalyst according to claim 1.

17. A method for purification of exhaust gas containing a phosphorus compound using the catalyst according to claim 1 by depositing a phosphorus compound in the intermediate zone.

* * * * *